(12) United States Patent
Harada

(10) Patent No.: US 8,459,147 B2
(45) Date of Patent: Jun. 11, 2013

(54) BALANCE ADJUSTING MEMBER AND A BALANCE ADJUSTING METHOD FOR A ROTOR

(75) Inventor: Tomonari Harada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1083 days.

(21) Appl. No.: 11/390,374

(22) Filed: Mar. 28, 2006

(65) Prior Publication Data

US 2006/0236796 A1    Oct. 26, 2006

(30) Foreign Application Priority Data

Mar. 28, 2005    (JP) .................................. 2005-92541

(51) Int. Cl.
*F16F 15/32* (2006.01)
*F16C 15/00* (2006.01)
*B60B 1/00* (2006.01)

(52) U.S. Cl.
USPC .......................... 74/572.4; 74/572.2; 301/5.21

(58) Field of Classification Search
USPC ............. 74/572.4, 572.21, 572.2, 574.2, 589, 74/590, 591, 603, 604, 570.1; 411/174, 175, 411/970, 522, 523; 24/555, 556, 545, 563; 301/5.21; 416/144, 145, 500
See application file for complete search history.

(56) References Cited

U.S. PATENT DOCUMENTS

| | | | | |
|---|---|---|---|---|
| 2,172,302 A * | 9/1939 | Tinnerman | .................... | 24/581.1 |
| 2,248,265 A * | 7/1941 | Wright | .......................... | 301/5.21 |
| 2,304,816 A * | 12/1942 | Griffith | ........................ | 301/5.21 |
| 2,505,031 A * | 4/1950 | Dach | .......................... | 188/218 A |
| 3,056,631 A * | 10/1962 | Mills | ............................. | 301/5.21 |
| 3,890,008 A * | 6/1975 | Lejeune | ....................... | 301/5.21 |
| 5,733,016 A * | 3/1998 | Brown | .......................... | 301/5.21 |
| 5,947,253 A * | 9/1999 | Yabe et al. | ................. | 192/110 R |
| 5,970,586 A * | 10/1999 | Demel et al. | .................... | 24/555 |
| 6,238,006 B1 * | 5/2001 | Manojlovic | .................. | 301/5.21 |
| 6,250,721 B1 * | 6/2001 | Oba et al. | ..................... | 301/5.21 |
| 6,484,374 B2 * | 11/2002 | McAllister | ....................... | 24/557 |
| 6,488,341 B2 * | 12/2002 | Maruyama et al. | .......... | 301/5.21 |
| 6,698,845 B2 * | 3/2004 | Corte et al. | .................. | 301/5.21 |
| 6,729,694 B2 * | 5/2004 | Maruyama | ..................... | 301/5.21 |
| 7,377,749 B2 * | 5/2008 | Charrier et al. | ............... | 416/119 |
| 2003/0067208 A1* | 4/2003 | Maruyama | .................... | 301/5.21 |

FOREIGN PATENT DOCUMENTS

| | | |
|---|---|---|
| JP | 63-041601 | 2/1988 |
| JP | 10-47434 | 2/1998 |
| JP | 10-47435 | 2/1998 |
| JP | 2002-147533 | 5/2002 |

* cited by examiner

*Primary Examiner* — Richard W Ridley
*Assistant Examiner* — Daniel Yabut
(74) *Attorney, Agent, or Firm* — Finnegan, Henderson, Farabow, Garrett & Dunner, L.L.P.

(57) ABSTRACT

A rotor balance adjusting member and a rotor balance correction method are disclosed. The rotor balance adjusting member has a ring member fixed to a pulley concentrically and comprises a weight and a clip member which fixes the weight to the ring member. The ring member has an outer side fit-in slot, and inner side fit-in slot, an outer side stop slot, and an inner side stop slot. The clip member comprises an elastic material and moves in a circumferential direction regulated by the outer side fit-in slot and the inner side fit-in slot. The weight fixed to the clip member is arranged in a position which counters the inner side of the ring member when the clip member is fitted in the ring member.

5 Claims, 7 Drawing Sheets

BALANCE ADJUSTING MEMBER AND A BALANCE ADJUSTING METHOD FOR A ROTOR

RELATED APPLICATIONS

This application claims priority to Japanese Application JP 2005-02541 filed on Mar. 28, 2005, the contents of which are incorporated herein by reference.

TECHNICAL FIELD

This invention relates to technology that corrects balance of a rotor.

BACKGROUND OF THE INVENTION

Correct rotor balance is important in oscillating control of the drive source of a rotor, the driving force transfer mechanism of a rotor, and also for preventing noise.

It is known that the unbalance of a rotor will happen according to the size difference in a rotor and its axis.

Various methods are used for correcting the balance of a rotor. For example, one method of adjusting the balance of a rotor (a "balance-adjusting method for rotor") is the method of attaching weight to a rotor. This method of attaching weigh to a rotor is disclosed, for example, in Japanese Laid Open Gazette No. 10-47435 ("patent reference 1") and Japanese Laid Open Gazette No. 2002-147533 ("patent reference 2"), A.

Another method is the method of scraping a part of a rotor.

When using the method disclosed in patent reference 1 and the patent reference 2, however, attachment and detachment of the weight to a rotor are not easy, and this method adversely impacts operation of the rotor.

When attachment and removal of weight are easier, the weight may separate and the rotor unbalance may occur during rotor rotation.

Correcting rotor balance by scraping a part of rotor results in an undesirable dispersion of scraps.

It is desirable to provide a balance adjusting member and balance adjusting method for a rotor wherein it is easy to attach and detach the weight to a rotor and prevent separation of the weight.

BRIEF SUMMARY OF THE INVENTION

Subjects that this invention are going to solve are like the above. Accordingly, a means for solving this subject is explained.

The present disclosure is directed to a balance-adjusting member having a ring member fixed to a rotor concentrically, a weight, a clip member which fixes said weight to said ring member, said ring member has a outer side fit-in slot formed in the outer side of the ring member in the direction of the axis, an inner side fit-in slot formed in the position corresponding to the outer side fit-in slot in the direction of the axis at inner side of the ring member, a outer side stop slot deeper than said outer side fit-in slot and formed in the direction of a circumference at the middle part of the outer side of this ring member, an inner side stop slot deeper than said outer side fit-in slot and formed in the direction of a circumference at the middle part of the outer side of this ring member, said clip member comprising of an elastic substance, whose motion of the circumference direction being regulated by the outer side fit-in slot and the inner-side fit-in slot, and being able to fit-in alternately to engage and disengage into said outer side stop slot and said inner side stop slot, said weight fixed to said clip member arranged in the position which counters the inner side of the ring member with the clip member fitted in the ring member.

The present disclosure is also directed to a balance-adjusting member, wherein an engagement projection is formed in said weight, an engagement hole is opened at a portion corresponding to the inner side of said ring member, said ring member has a release slot corresponds to said engagement projection.

The present disclosure is further directed to a balance-adjusting member, wherein said ring has a tapered surface in an end.

The present disclosure is also directed to a balance-adjusting member, wherein said ring member and said rotor are integrated.

The present disclosure is further directed to a method of adjusting balance of rotor comprising a fixing process for a ring member, wherein said fixing process for a ring member is a process which fixes a ring member to a rotor in the shape of a concentric circle, wherein said ring member has a outer side fit-in slot formed in a predetermined position of the outer side in the axis direction, an inner-side fit-in slot formed in a position corresponding to a outer side fit-in slot in the axis direction in an inner side, a outer side stop slot which is deeper than the outer side fit-in slot and was formed in the direction of a circumference at a middle part of the outer side, and an inner-side stop slot which was deeper than a the inner-side fit-in slot and was formed in the direction of a circumference at a middle part of a the inner side, a weight fitting process, wherein said weight fitting process is a process comprising, in a state where the weight fixed to a clip member, wherein said clip member consists of an elastic substance and is regulated a motion of the circumference direction by the outer side fit-in slot and the inner side fit-in slot, fixing the clip member to the outer side stop slot and the inner side stop slot with capability to fit-in alternately to engage and disengage into, arranging the weight in a position which counters an inner side of a member.

The present disclosure is also directed to a method of adjusting balance of rotor, wherein an engagement projection is formed in said weight, an engagement hole is opened at a portion corresponding to the inner side of said ring member, said ring member has a release slot corresponds to said engagement projection.

The present disclosure is further directed to a method for adjusting balance of rotor, said ring member has a tapered surface in an end.

The present disclosure is also directed to a method of adjusting balance of rotor comprising a fabricating process for a ring member, wherein said fabricating process for a ring member is a process which fabricates a ring member integrated with a rotor concentrically, wherein said ring member has a outer side fit-in slot formed in a predetermined position of the outer side in the axis direction, an inner-side fit-in slot formed in a position corresponding to a outer side fit-in slot in the axis direction in an inner side, a outer side stop slot which is deeper than the outer side fit-in slot and was formed in the direction of a circumference at a middle part of the outer side, and an inner-side stop slot which was deeper than a the inner-side fit-in slot and was formed in the direction of a circumference at a middle part of a the inner side, a weight fitting process, wherein said weight fitting process is a process comprising, in a state where the weight fixed to a clip member, wherein said clip member consists of an elastic substance and is regulated a motion of the circumference direction by the outer side fit-in slot and the inner side fit-in slot, fixing the clip member to the outer side stop slot and the inner side stop slot with capability to fit-in alternately to engage and disengage into, arranging the weight in a position which counters an inner side of a member.

The present disclosure is further directed to a method of adjusting balance of rotor, wherein an engagement projection is formed in said weight, an engagement hole is opened at a portion corresponding to the inner side of said ring member, said ring member has a release slot corresponds to said engagement projection.

The present disclosure is also directed to a method for adjusting balance of rotor wherein, said ring member has a tapered surface in an end.

DETAILED DESCRIPTION OF THE INVENTION

As broadly embodied herein, a balance adjusting member 1, as an example of a balance adjusting member, is explained with reference to FIG. 1, FIG. 2, FIG. 3, and FIGS. 4, 5, and 6.

The following explanation shows a pulley 10, fixed to an engine output axis as an example of a rotor. The invention is not limited to this embodiment, but can be widely applied to all rotors.

Figure 1:
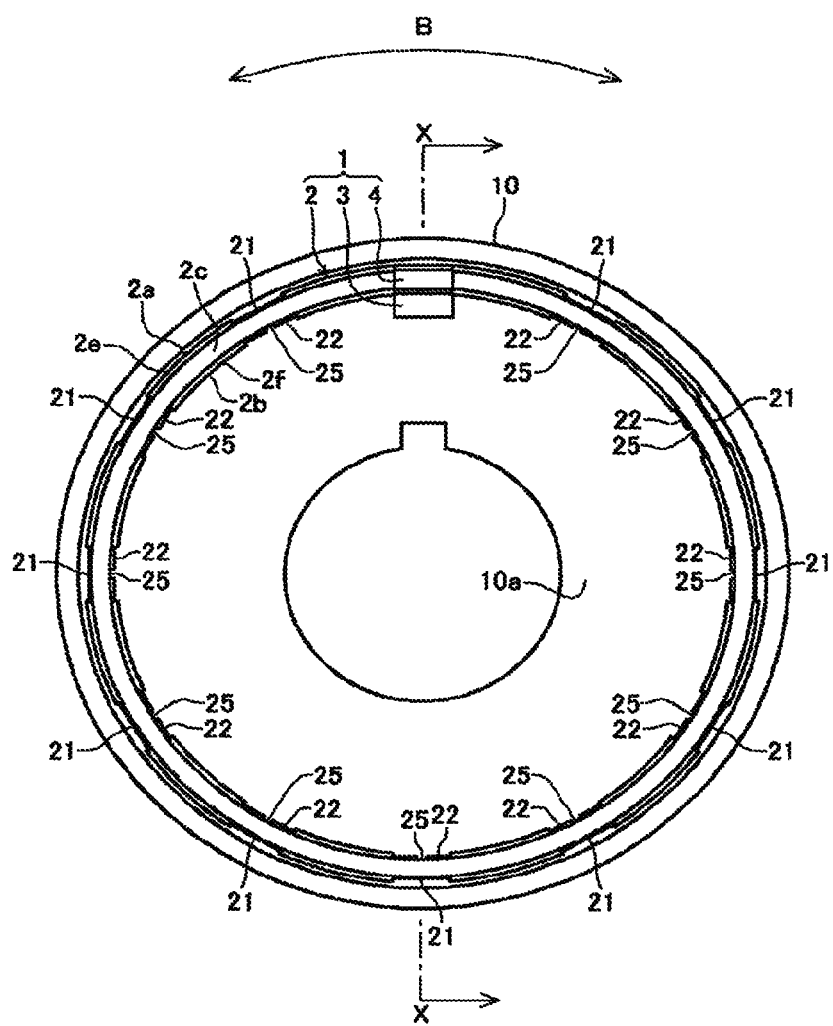
FIG. 1 is a front view of the embodiment of the rotor balance adjusting member of the invention.
Figure 2:
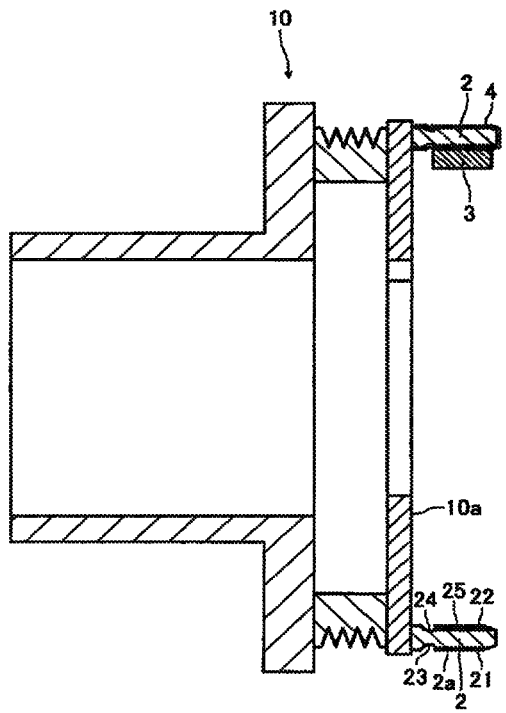
FIG. 2 is a side sectional view of the embodiment of the rotor balance adjusting member of the invention.
Figure 3:
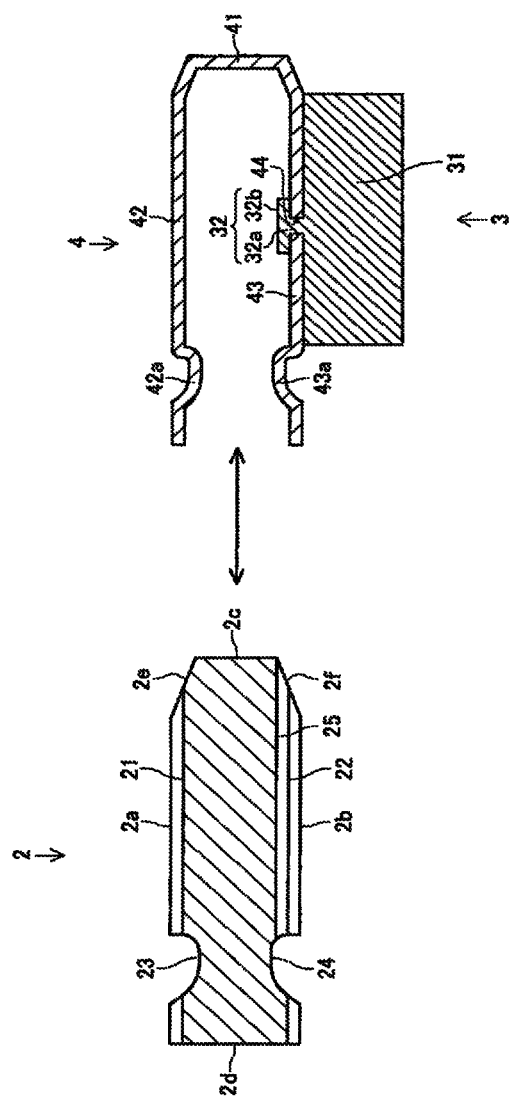
FIG. 3 is a side expanded sectional view of the embodiment of the rotor balance adjusting member of the invention.
Figure 4:
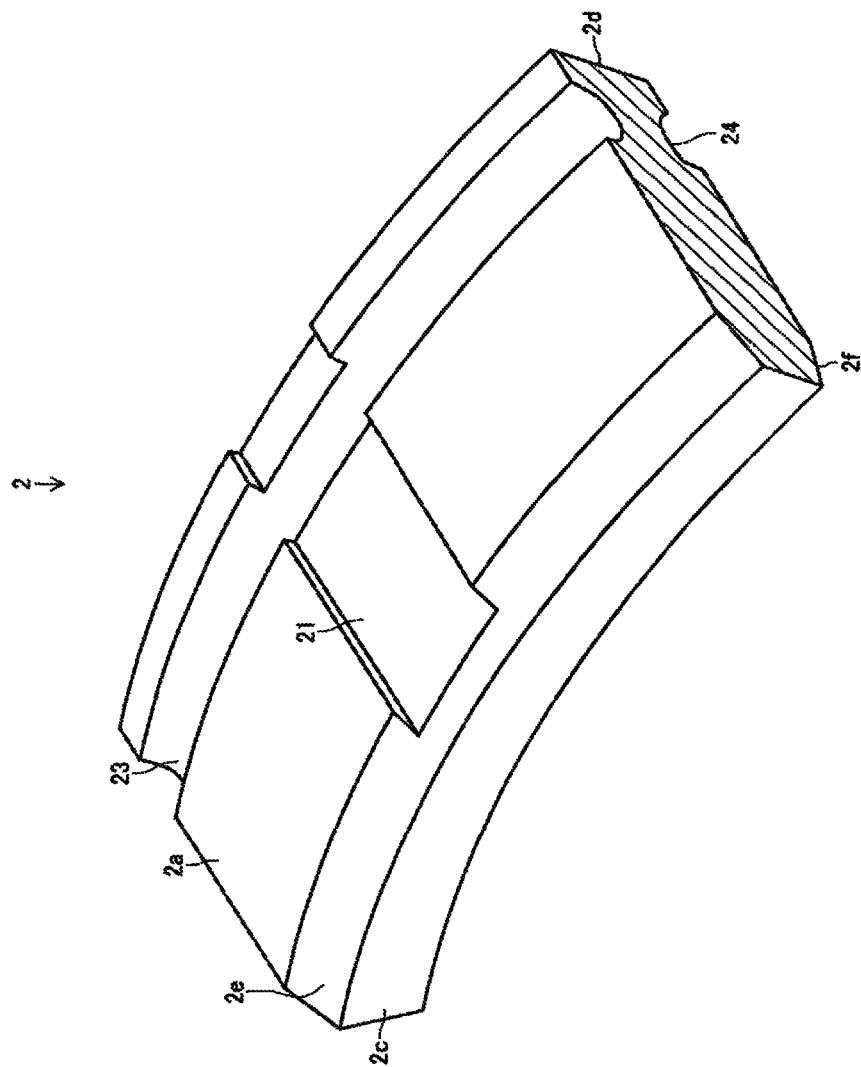
FIG. 4 is a perspective view of the principal part of a ring member.
Figure 5:
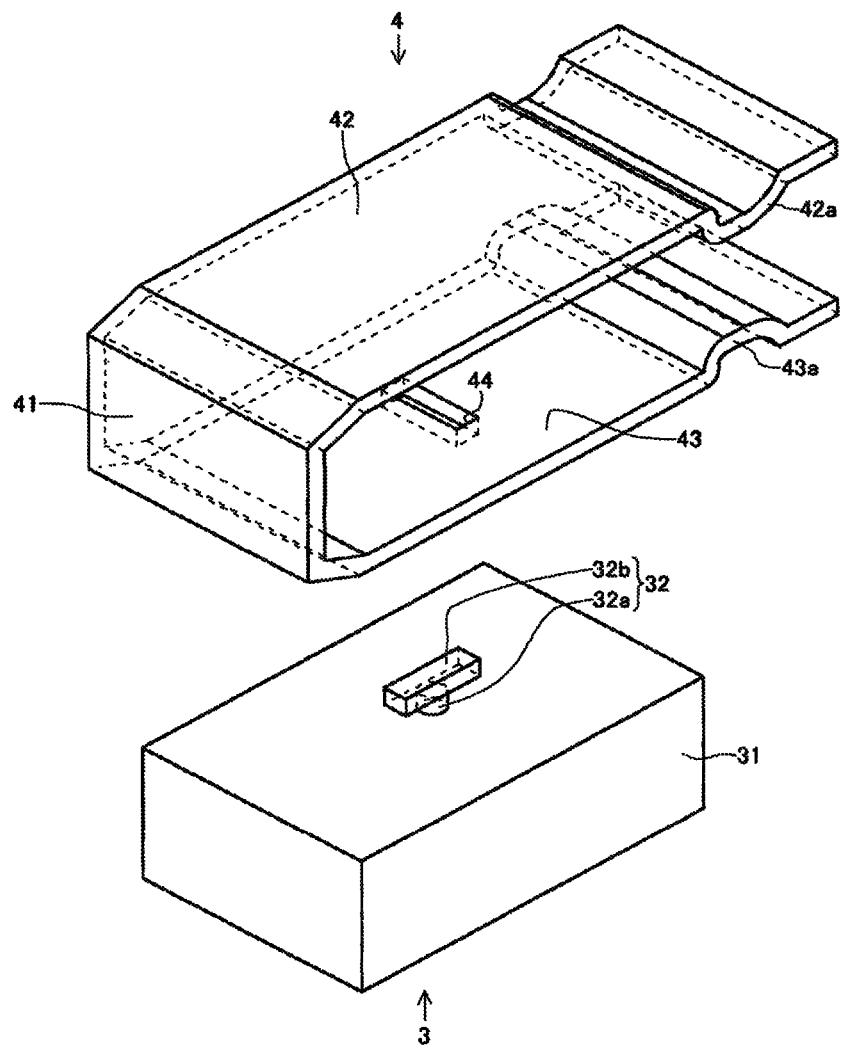
FIG. 5 is a perspective view of a weight and a clip member.
Figure 6:
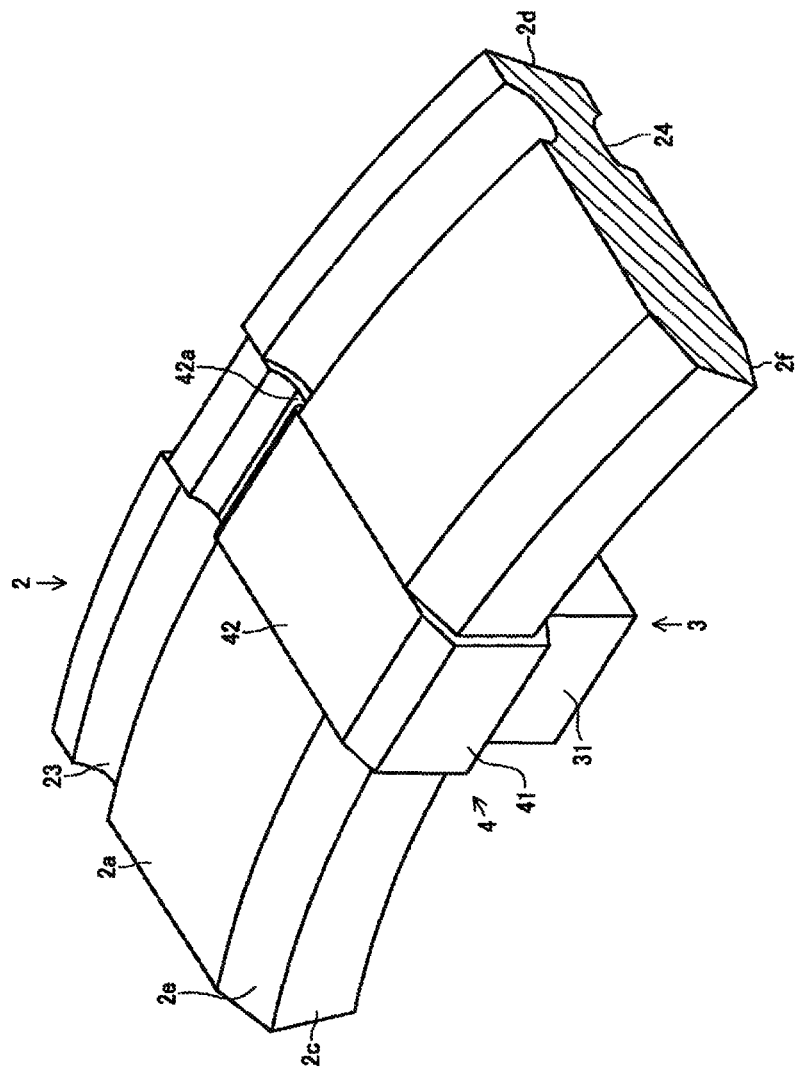
FIG. 6 is a perspective view of the principal part of the embodiment of the rotor balance adjusting member of this invention.

Here, the "rotor" in this application means an object, which revolves on an axis. For purposes of explanation in this application, the direction of the arrow A broadly depicted in FIG. 2 is defined as the direction of an axis, the direction which intersects perpendicularly with the arrow A is defined as the radius direction, the direction of the arrow B broadly depicted in FIG. 1 is defined as the direction of a circumference. The following explanation is given using these.

The pulley 10 broadly depicted in FIGS. 1 and 2 is an example of the rotor concerning this invention, and is fixed to an engine output axis. The engine which is the source of a drive force is not illustrated.

As broadly depicted in FIGS. 1 and 2, a rotor balance adjusting member 1 balances a pulley 10, and has a ring member 2, a weight 3, and a clip member 4, etc.

As broadly depicted in FIGS. 1 and 2, the ring member 2 is an abbreviated ring shape member, and has an outer side 2a, an inner side 2b, a front end planar surface side 2c, and 2d of back end sides.

The ring member 2 is fixed to front 10 of back end side 2d in the shape of concentricity.

Outer side taper planar surface 2e and inner side tapered planar surface 2f are formed in the end of the ring member 2, respectively. The end of the ring member 2 is specifically the boundary part of front end planar surface side 2c and outer side 2a, and the boundary part of front end planar surface side 2c and inner side 2b.

As used herein, "the shape of concentricity" means that the axis of the pulley 10 which is a rotor, and the axis of the ring member 2, are mostly in agreement in this embodiment.

The ring member 2 has plural outer side fit-in slots 21, plural inner side fit-in slots 22, an outer side stop slot 23, an inner side stop slot 24, a releasing groove 25, etc.

Outer side fit-in slot 21 is a slot formed in a position with outer side 2a of the ring member 2 in the direction of an axis.

The direction of a straight side of the outer side fit-in slot 21 is mostly in agreement with the direction of an axis of the ring member 2. The direction of the axis of the ring member 2 is broadly depicted as the arrow A in FIG. 2.

In this embodiment, the outer side fit-in slot 21 is arranged at a total of 12 places at outer side 2a of the ring member 2, and the interval of the adjacent outer side fit-in slot 21-21 is almost the same.

Inner side fit-in slot 22 is a slot. The inner side fit-in slot 22 is formed in the inner side 2b of the ring member 2 in a position corresponding to the outer side fit-in slot 21 in the direction of an axis.

In other words, the direction of a straight side of the inner side fit-in slot 22 is mostly in agreement with the direction of the axis of the ring member 2. The direction of the axis of the ring member 2 is the direction of the arrow A broadly depicted in FIG. 2. Each inner side fit-in slot 22 overlaps with each outer side fit-in slot 21 in the state where it saw from the radius.

A total of 12 inner side fit-in slots 22 are arranged at inner side 2b of the ring member 2. The interval of the adjacent inner side fit-in slots 22-22 is almost the same.

In this embodiment, the sum total of outer side fit-in slots 21 and the sum total of inner side fit-in slots 22 are 12 in outer side 2a and inner-side 2b of the ring member 2, respectively.

The part where a slot is arranged is not limited to 12 places, but responds to the size of the ring member 2 etc.

An outer side stop slot 23 is a slot formed in the direction of a circumference at the middle part of outer side 2a of the ring member 2.

The direction of a straight side of the outer side stop slot 23 is mostly in agreement with the direction of a circumference of the ring member 2 (i.e., the direction of the arrow B in FIG. 1).

The outer side stop slot 23 is a ring-like slot. The depth of the outer side stop slot 23 is the depth from outer side 2a to the bottom of the outer side stop slot 23. The depth of the outer side stop slot 23 is deeper than the depth of the outer side fit-in slot 21.

The inner side stop slot 24 is a slot formed in the direction of a circumference at the middle part of inner-side 2b of the ring member 2. The direction of the straight side of the inner side stop slot 24 is mostly in agreement with the direction of a circumference of the ring member 2. The direction of the circumference of the ring member 2 is the direction of the arrow B in FIG. 1. The inner side stop slot 24 is a ring-like slot. The depth of the inner side stop slot 24 is the depth from inner-side 2b to the bottom of an inner side stop slot 24. The depth of the inner side stop slot 24 is deeper than the depth of the inner side fit-in slot 22.

In this embodiment, the ring member 2 and the pulley 10 are separated, and the ring member 2 is fixed to the pulley 10. In other embodiments, the ring member 2 and the pulley 10 can be fabricated as one.

Due to the aforementioned structures, the work necessary to accurately fix the ring member 2 to the pulley 10 in the shape of concentricity can be eliminated, the amount work can be reduced, and workability improves.

Weight 3 is an object which has predetermined mass. Weight 3 has a body part 31, an engagement projection 32, etc.

The body part 31 is made of the member of abbreviated rectangular parallelepiped form, and the engagement projection 32 is formed in the surface thereof.

In this embodiment, the engagement projection 32 is made of a base 32a and an engagement part 32b, and has a T-shaped form.

The desired mass of weight 3 can be adjusted by scraping the body part 31.

The weight 3 of desired mass can also be chosen using a weight 3 that has a commonly formed engagement projection 32, but has a body part 31 of a different volume.

The clip member 4 fixes to the ring member 2, and can detach and attach weight 3. The clip member 4 is made from metal shaped like an abbreviated rectangular board bent in an abbreviated U shape. The clip member 4 has a connection part 41, an outer side fit-in part 42, an inner-side fit-in part 43, etc.

The connection part 41 corresponds to the abbreviated central part before crookedness of the metal plate which constitutes the clip member 4. The outer side fit-in part 42 and the inner-side fit-in part 43 are installed in the both ends of the connection part 41, respectively.

The outer side fit-in part 42 extends from the end of the connection part 41. A stop part 42a is formed in the tip part of the outer side fit-in part 42.

The inner-side fit-in part 43 extends at the other ends of the connection part 41, and stop part 43a is formed in the tip part of the inner-side fit-in part 43. The engagement hole 44 is formed in the inner-side fit-in part 43.

The form of the engagement hole 44 exactly corresponds to the form of the engagement part 32b. Engagement part 32b is inserted in the engagement hole 44, and the weight 3 is rotated relative to the clip member 4 centering on base 32a. In this manner, weight 3 may be fixably attached and detached from the clip member 4.

The clip member 4 is fitted toward back end sides 2d along the outer side fit-in slot 21 and an inner side fit-in slot 22 from front end planar surface side 2c of the ring member 2.

In this embodiment, the width of the clip member 4, and the width of the outer side fit-in slot 21 and an inner side fit-in slot 22 are the same in the direction of a circumference. Therefore, the clip member 4 and weight 3 prevent shifting in the direction of a circumference to the ring member 2 due to vibration during rotation of the pulley 10 etc.

When the clip member 4, including the attachable weight 3, is fitted on the ring member 2 along the outer side fit-in slot 21 and the inner side fit-in slot 22, the stop part 42a and the stop part 43a of the clip member 4 engage with the outer side stop slot 23 and the inner side stop slot 24, respectively.

The clip member 4 and weight 3 thus prevent shifting in the direction of the axis to the ring member 2 due to vibration during rotation of the pulley 10 etc.

The weight 3 is fixably attached to and detached from the clip member 4 by the engagement projection 32.

When in the clip member 4, the engagement projection 32 projects on the surface which contacts the inner side of the ring member 2.

In this embodiment, the releasing groove 25 is formed in the direction of the axis on the ring member 2. Releasing groove 25 prevents interference with the engagement projection 32 and the ring member 2. The releasing groove 25 is formed in the direction of an axis in the portion corresponding to the engagement projection 32 in a fit-in state. In other words, releasing groove 25 is formed in a nearly central part of the inner side fit-in slot 22 of the ring member 2.

A width of the releasing groove 25 is narrower than a length of the long side of the engagement part 32b. Releasing groove 25 prevents rotation of weight 3 relative to the clip member 4, the release of the engagement projection 32 from the engagement hole 44, and the separation of weight 3 from the pulley 10 during rotation of the pulley 10.

The releasing groove 25 can be omitted when the weight 3 is fixed to the clip member 4 with glue etc., and when the engagement projection 32 is not formed in weight 3.

When the clip member 4, including the attachable weight 3, is fitted in the ring member 2 along with the outer side fit-in slot 21 and the inner side fit-in slot 22, the clip member 4 is arranged in a position that counters inner-side 2b of the ring member 2.

During rotation of the pulley 10, a centrifugal force in the radial direction of the pulley 10 is applied to the weight 3.

Weight 3 is supported by the ring member 2 and pushed against inner-side 2b of the ring member 2.

Therefore, weight 3 prevents omission from the ring member 2 and the pulley 10 due to the centrifugal force from rotation of the pulley 10.

The weight 3 of this embodiment is fixably attached to and detached from the clip member 4 by the engagement projection 32. In addition, the engagement projection 32, the engagement hole 44, and the releasing groove 25 may be omitted by fixing weight to a clip member by methods, such as adhesion or welding.

As mentioned above, the rotor balance adjusting member 1 of this embodiment includes the ring member 2, which is fixed to the pulley 10 concentrically. The balance adjusting member 1 also includes the weight 3 and the clip member 4, which fixes the weight 3 to the ring member 2.

The ring member 2 has plural outer side fit-in slots 21 formed in predetermined positions on the outer side 2a of the ring member 2 in the direction of an axis; plural inner side fit-in slots 22 formed in the position corresponding to the outer side fit-in slot 21 in the direction of an axis at the inner-side 2b of the ring member 2; the outer side stop slot 23, which is deeper than the outer side fit-in slot 21, and formed in the direction of a circumference at the middle part of outer side 2a of the ring member 2; and the inner side stop slot 24, which is deeper than an inner side fit-in slot 22, and formed in the direction of a circumference at the middle part of inner-side 2b of the ring member 2.

Clip member 4, which is made by bending an almost rectangular metal plate in the shape of a U, has a stop part 42a and a stop part 43a which are formed in both ends, respectively.

The clip member 4 is fitted on the ring member 2 along the outer side fit-in slot 21 and the inner side fit-in slot 22. The stop parts 42a and 43a engage with the outer side stop slot 23 and the inner side stop slot 24, respectively. The weight 3 fixed to the clip member 4 is arranged in the position that counters inner-side 2b of the ring member 2.

The weight 3 fixed to the ring member 2 by the clip member 4 can be prevented from separating from the pulley 10 due to the centrifugal force and vibration caused by rotation of the pulley 10. The weight 3 can be easily attached in the pulley 10 by fitting in the ring member 2 in the direction of an axis. Weight 3 can easily be removed from the pulley 10 by drawing it out in the direction of an axis from the ring member 2.

The vibrational force acting on weight 3 in the direction of an axis is smaller than the centrifugal force which acts on weight 3 during rotation of the pulley 10. Stop parts 42a and 43a, therefore, engage with the outer side stop slot 23 and the inner side stop slot 24, respectively, and the weight 3 does not shift in the direction of the axis during rotation of the pulley 10.

The clip member of this invention is not limited by the clip member 4 of this embodiment. The clip member provides the same effect at other structures when the following conditions are satisfied. The clip member should consist of elastic material, such as a metal material and a resin material. The clip member should fit on the outer side stop slot and the inner side stop slot, and be able to be removed when the circumferential motion is regulated by the outer side fit-in slot and the inner side fit-in slot. The weight fixed to the clip member should be arranged in the position which counters the inner side of a ring member when the clip member fits on the ring member.

The engagement projection 32 is formed in weight 3. The engagement hole 44 is formed in the portion corresponding to the inner-side 2b of the ring member 2 in the clip member 4. The releasing groove 25 corresponding to the engagement projection 32 is formed in the ring member 2.

By such structure, the engagement projection 32 is engaged with the engagement hole 44 and the weight 3 can be easily fixably attached to and detached from to the clip member 4, thereby, improving workability.

Due to the outer side taper planar surface 2e and inner side tapered planar surface 2f formed in the end of the ring member 2, the clip member 4, to which weights 3 are fixed, can be easily fitted in the ring member 2, and workability improves.

In another embodiment of a rotor balance adjusting member 1, the ring member 2 and the pulley 10 are fabricated in one. In this embodiment, the work for fixing the ring member 2 to the pulley 10 concentrically can be omitted, operations can be reduced, and workability improves.

Figure 7:
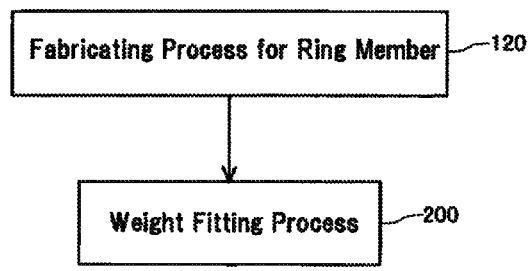
FIG. 7 is a diagram of the first embodiment of the rotor balance correction method of this invention.
Figure 8:
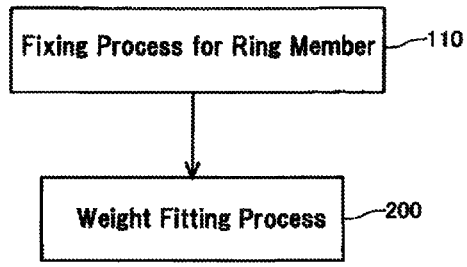
FIG. 8 is a diagram of the second embodiment of the rotor balance correction method of this invention.

FIG. 7 (*a*) and the first embodiment of the rotor balance correction method are explained below. In the following explanation, the rotor balance adjusting member 1, broadly depicted in FIG. 6 from FIG. 1, is used for convenience.

The pulley 10 is balanced in the first embodiment of the rotor balance correction method. The method includes a ring member fixation process 110, a weight fit-in process 200, etc.

The ring member fixation process 110 is a process that concentrically fixes the ring member 2 to the pulley 10. After the ring member fixation process 110 is completed, the method proceeds to the weight fit-in process 200.

In weight fit-in process 200, the clip member 4, including weight 3 fixed thereto, is fitted on the ring member 2. Specifically, during the ring member fixation process 110, the engine that includes the pulley 10, to which the ring member 2 is fixed, is driven; the pulley 10 is rotated; and vibration by rotation of the pulley 10 is measured. A calculation means etc. is used for measurement of vibration. A calculation means computes the size of vibration in the direction of the axis, periphery, and radius, using the output signal from at least one sensor which detects vibration, such as an acceleration sensor etc. The weight and the attachment position of weight 3 for canceling vibration are computed. A measurement result determines the weight of weight 3 and the attachment position of weight 3 (in the case of this embodiment, 12 sets of outer side fit-in slots 21 and inner side fit-in slots 22 which are formed in the ring member 2). The weight 3, which is adjusted to the determined weight, is fitted on the determined outer side fit-in slot 21 and the inner side fit-in slot 22 by the clip member 4.

As indicated above, the first embodiment of the rotor balance correction method includes the ring member fixation process 110 and the weight fit-in process 200. The ring member fixation process 110 is a process that concentrically fixes the ring member 2 to the pulley 10. Ring member 2 has the outer side fit-in slot 21 formed in the predetermined position of outer side 2a in the direction of an axis, the inner side fit-in slot 22 formed in the position corresponding to the outer side fit-in slot 21 in the direction of an axis in inner-side 2b, the outer side stop slot 23 formed in the circumferential direction at the middle part of outer side 2a more deeply than the outer side fit-in slot 21, and the inner side stop slot 24 formed in the circumferential direction at the middle part of inner-side 2b more deeply than an inner side fit-in slot 22. During the weight fit-in process 200, weight 3 is fixed to the crooked clip member 4; clip member 4 is fitted on the ring member 2 along the outer side fit-in slot 21 and an inner side fit-in slot 22; stop parts 42a and 43a are engaged with any 1 set of the outer side fit-in slot 21 and the inner side fit-in slot 22; and weight 3 is arranged in the position which counters inner-side 2b of the ring member 2.

This embodiment provides the following advantages. The weight 3, when fixed to the ring component 2 by the clip component 4, can prevent shifting from a fixed position or dropping out of the pulley 10 by the centrifugal force of the pulley 10 or vibration. The attachment to and removal from the pulley 10 are easy because the weight 3 is fitted in the direction of an axis to the ring component 2 and drawn out in the direction of an axis from the ring component 2. In addition, the strength of the vibration acting on weight 3 in the direction of the axis etc. during rotation of the pulley 10 is small compared to the centrifugal force during rotation of the pulley 10. Therefore, when the stop-parts 42a and 43a fit into the outer side stop slot 23 and an inner side stop slot 24, respectively, weight 3 does not shift in the direction of an axis during rotation of the pulley 10.

The weight fit-in process of this invention is not limited to the weight fit-in process 200 of this embodiment. When weight is fixed to the clip member, which consists of an elastic material, such as a metal material and a resin material, a circumferential motion of the clip member is regulated by the outer side fit-in slot and the inner side fit-in slot. It fits in the outer side stop slot and the inner side stop slot in a state which can freely detach and attach the clip member. When it is the process that arranges weight in the position that counters the inner side of this ring member, there is same effect at other processes.

The second embodiment of the rotor balance correction method is explained using FIG. 7 (*b*). The following description uses the rotor balance adjusting member 1 broadly depicted in FIGS. 1-6 for convenience.

The second embodiment of the rotor balance correction method is a method by which the balance of the pulley 10 is corrected. The method includes a ring member fabrication process 120, a weight fit-in process 200, etc.

The ring member fabrication process 120 fabricates the ring member 2 and the pulley 10 as one. The ring member fabrication process 120 also fabricates the ring member 2 and the pulley 10 concentrically. After finishing the ring member fabrication process 120, the method proceeds to the weight fit-in process 200. Since the weight fit-in process 200 is almost the same as the first embodiment of the rotor balance correction method, an explanation thereof is omitted.

As indicated above, the second embodiment of the rotor balance correction method includes the ring member fabrication process 120 and the weight fit-in process 200. Ring member 2 has the outer side fit-in slot 21 formed in the predetermined position of outer side 2a in the direction of an axis, the inner side fit-in slot 22 formed in the position corresponding to the outer side fit-in slot 21 in the direction of an axis in inner-side 2b, the outer side stop slot 23 deeper than the outer side fit-in slot 21 formed in the circumferential direction at the middle part of outer side 2a, and the inner side stop slot 24 deeper than the inner side fit-in slot 22 formed in the circumferential direction at the middle part of inner-side 2b. During the weight fit-in process 200, while weight 3 is fixed to the clip member 4, the clip member 4 is fitted in the ring member 2 along the outer side fit-in slot 21 and an inner side fit-in slot 22; stop-parts 42a and 43a are fitted in any 1 set of the outer side fit-in slot 21 and the inner side fit-in slot 22; and weight 3 is arranged in the position that counters inner-side 2b of the ring member 2. The clip member 4 is bent in approximately a U-shaped form using a metal plate with the shape of an abbreviated rectangular board. The stop parts 42a and 43a are formed in the both ends of the clip member 4, respectively.

The previously described system has the following effects. The weight 3 fixed to the ring member 2 by the clip member 4 can be prevented from moving out of a fixed position. The weight can also be prevented from separating from the pulley 10 due to the centrifugal force and vibration caused by rotation of the pulley 10. By fitting in the ring member 2, the weight 3, which is currently fixed to the clip member 4 in the direction of an axis with the clip member 4, can be easily attached in the pulley 10. Weight 3 can be easily removed from the pulley 10 by drawing it out in the direction of an axis from the ring member 2. In addition, the vibrational force in the direction of an axis during rotation of the pulley 10 etc. acting on weight 3 is fainter than the centrifugal force which acts on weight 3 during rotation of the pulley 10. Therefore, stop parts 42a and 43a engage with the outer side stop slot 23 and the inner side stop slot 24, respectively, and the weight 3 does not shift in the direction of an axis during rotation of the pulley 10.

The clip member of this invention is not limited by the weight fitting process 200 of this embodiment. Where weight is fixed to a clip member, which consists of elastic material, such as metal material and resin material, regulating a motion of the circumferential direction for this clip member by this outer side fit-in slot and this inner side fit-in slot, it fits in at the state which can be freely detached and attached to this outer side stop slot and this inner side stop slot, and when it is the structure that arranges this weight in the position that counters the inner side of this ring member, the effect that other structures are the same will be done so.

The invention of the present disclosure has the following effects.

It can prevent the separation of a weight and the divergence of the weight from a fixed position due to centrifugal force and vibration. The weight can be easily detached from and attached to a rotor.

The weight of the disclosed device can easily be fixably attached and detached to a clip member, thereby improving workability.

The clip member of the disclosed device, to which the weight is fixed, can be easily fitted on a ring member, thereby improving workability.

The work required to concentrically fix the ring member to a rotor is omissible. The work process for fixing can be reduced and workability is improved.

What is claimed is:

1. A balance-adjusting member comprising:
a rotor defining an axis,
a ring member fixed to the rotor concentrically,
a weight,
a clip member which fixes said weight to said ring member,
said ring member comprising:
an outer side fit-in slot formed in an outer side of the ring member, the outer side fit-in slot having a length in a direction substantially parallel to the axis and a width in a circumferential direction of the ring member,
an inner side fit-in slot formed in the inner side of the ring member in a position corresponding to the outer side fit-in slot, the inner side fit-in slot having a length in a direction substantially parallel to the axis and a width in a circumferential direction of the ring member,
an outer side stop slot deeper than said outer side fit-in slot and formed in a direction of a circumference at a middle part of the outer side of the ring member, the outer side stop slot extending along an entire circumference of the ring member, and
an inner side stop slot deeper than said inner side fit-in slot and formed in the direction of a circumference at a middle part of the inner side of the ring member, the inner side stop slot extending along the entire circumference of the ring member,
said clip member comprising an elastic substance, whose motion in the circumference direction is regulated by the outer side fit-in slot and the inner-side fit-in slot, and being able to fit-in alternately to engage and disengage into said outer side stop slot and said inner side stop slot, said weight fixed to said clip member at the inner side of the ring member with the clip member fitted in the ring member.

2. A balance-adjusting member as claimed in claim 1, wherein an engagement projection is formed in said weight, an engagement hole is located at a portion of said clip member corresponding to the inner side of said ring member, said ring member has a release slot that corresponds to said engagement projection, and
wherein the release slot is defined in a central portion of the inner side fit-in slot and has a length extending in the direction substantially parallel to the axis.

3. A balance-adjusting member as claimed in claim 1 or 2, wherein said ring member has a front end planar surface, an outer side planar surface extending downward from an opening of the outer side fit-in slot to a top edge of the front end planar surface, and an inner side planar surface extending upward from an opening of the inner side fit-in slot to a bottom edge of the front end planar surface.

4. A balance-adjusting member as claimed in claim 1, wherein said ring member and said rotor are integrated.

5. A balance-adjusting member comprising:
a rotor defining an axis
a ring member fixed to the rotor concentrically,
a weight,
a clip member which fixes said weight to said ring member,
said ring member comprising:
an outer side fit-in slot formed in an outer side of the ring member, the outer side fit-in slot having a length in a direction substantially parallel to the axis and a width in a circumferential direction of the ring member, the length of the outer side fit-in slot being greater than the width of the outer side fit-in slot,
an inner side fit-in slot formed in the inner side of the ring member in a position corresponding to the outer side fit-in slot, the inner side fit-in slot having a length in a direction substantially parallel to the axis and a width in a circumferential direction of the ring member, the length of the inner side fit-in slot being greater than the width of the inner side fit-in slot,
an outer side stop slot deeper than said outer side fit-in slot and formed in a direction of a circumference at a middle part of the outer side of the ring member, the outer side stop slot extending along an entire circumference of the ring member, and an inner side stop slot deeper than said inner side fit-in slot and formed in the direction of a circumference at a middle part of the inner side of the ring member, the inner side stop slot extending along the entire circumference of the ring member, said clip member comprising an elastic substance, whose motion in the circumference direction is regulated by the outer side fit-in slot and the inner-side fit-in slot, and being able to fit-in alternately to engage and disengage into said outer side stop slot and said inner side stop slot, said weight fixed to said clip member at the inner side of the ring member with the clip member fitted in the ring member.

* * * * *